Feb. 28, 1956    J. J. WITTMANN, JR    2,736,124
FISHING LURE
Filed Dec. 23, 1953

INVENTOR.
JOSEPH J. WITTMANN, JR.
BY
McMorrow, Berman & Davidson
ATTORNEYS.

United States Patent Office 2,736,124
Patented Feb. 28, 1956

2,736,124
FISHING LURE

Joseph J. Wittmann, Jr., Tucson, Ariz.

Application December 23, 1953, Serial No. 399,911

1 Claim. (Cl. 43—42.23)

The present invention relates to improvements in lures of the artificial bait type.

It is an object of this invention to provide an artificial lure particularly designed for better trolling by facilitating its passage through the water and at the same time giving it more life-like motion as it is pulled through the water; and to provide in a single lure means whereby deep and shallow trolling is made easier and more positive pull being exerted upon the lure by the fishing line.

Other objects and advantages will become apparent from the following detailed description, forming the specification, taken in conjunction with the accompanying drawing, wherein.

Figure 1:
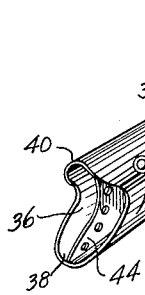
Figure 1 is a perspective view of a lure according to this invention.
Figure 2:
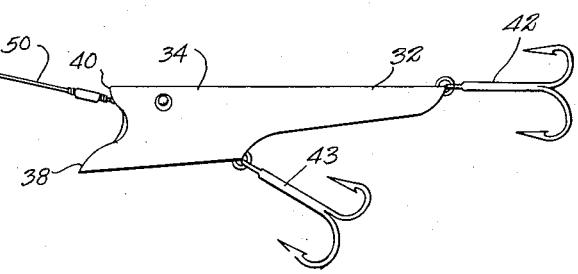
Figure 2 is a side elevational view thereof.
Figure 5:
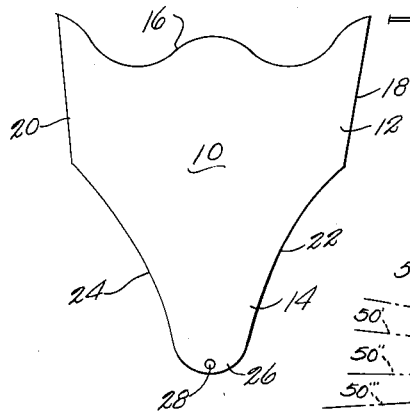
Figure 5 is a blank of material from which the lure is made.
Figure 3:
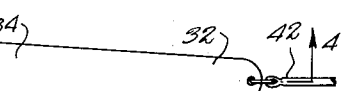
Figure 3 is a top plan view.

With continued reference to the drawing, the blank of material 10 shown in Figure 5 is preferably of a thin sheet metal or suitable plastic material. The blank of material 10 is a generally elongated body, one end portion 12 being wider than the other portion 14. The portion 12 has a wavy or serpentine top edge 16 which is similarly formed on either side of the longitudinal center line through the blank 10. The opposite sides 18 and 20 of portion 12 taper inwardly from the top edge 16 and the sides 22 and 24 of the other portion 14 are arcuately concavely formed to terminate in an arcuate tip 26 arranged as the end of portion 14 and along the longitudinal center line of the blank. A hole 28 is provided in the tip 26 on the longitudinal center line of the blank.

The blank 10 is bent about its longitudinal center line to bring the sides 18 and 20 together so as to form an elongated, open-ended, tubular body 30, somewhat oval in cross section, and with the portion 14 defining an arcuate hood or extension 32 of the main body portion 34 defined by the end portion 12 of the blank 10. The top edge 16 defines a mouth 36, when the lure is formed from the blank, which has a protruding lower lip 38 and an upper lip 40. A conventional tri-pronged fish hook 42 is carried in the hole 28 and a similar hook 43 may be carried by the main body portion 34 at a location remote from the lower lip 38 of the mouth 36.

Figure 4:
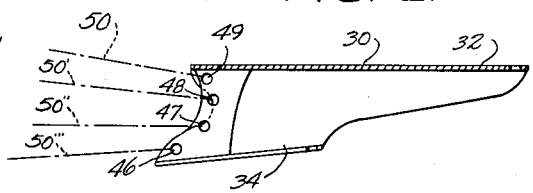
Figure 4 is a longitudinal cross sectional view taken along line 4—4 of Figure 3.

A line securing rib or plate 44 is provided in the mouth 36 and extends from the top lip 40 to the lower lip 38 along the longitudinal center line of the body 30. A row of spaced apart apertures 46, 47, 48 and 49 are provided along one marginal edge of the thin line attaching plate 44 adjacent the entrance of the mouth 36 to receive a fishing line 50 selectively in one of the apertures, to secure the lure to the line. As best shown in Figure 4, the line 50 will be secured in the aperture 49 when the lure is employed for deep fishing so that the lure will more easily be maintained at the deep location when it is pulled through the water since the angle between the lure and the pole will be such as to tend to keep the lure traveling through the water at a greater depth and overcoming any tendency for the lure to rise.

For medium depth fishing the lines 50' and 50'' will be secured in apertures 48 and 47 respectively, while for shallow fishing the fishing line 50''' will be secured in the aperture 46. In each case, the angle between the lure and the rod will be changed so that optimum results will be obtained for the depth of fishing desired.

Due to the hollow construction of the body 30, less resistance will be encountered as the lure is pulled through the water. Also, the water entering through the mouth 36 will assist in maintaining the lure at the desired depth as well as imparting more life-like motion to the lure.

Figure 6:
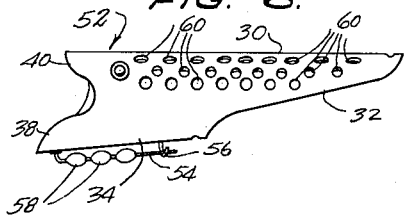
Figure 6 is a modified form of the lure.

In Figure 6, the lure, generally indicated at 52, is identical with the lure of Figures 1–4 except that lure 52 is additionally provided with a catch 54 which is detachably secured in a hook 56, both of which are carried on the lower surface of the main body portion 34, to hold weights 58 for deeper fishing. Also, the lure 52 may have a plurality of holes 60 in the body 30 for making the lure lighter in weight.

Where the lure is to be made of a suitable plastic material, the blank 10 need not be first provided since the lure may be molded as a one-piece construction. However, whether the lure is to be made of metal or plastic, the blank 10 may be first provided. Also, the fishing lure may be made in various sizes and provided in a variety of colors depending upon the specific type of fishing in which it is to be employed.

While there are shown and described the preferred embodiment of the invention, it is to be understood that the structure is susceptible to change and modification within the practicability of the invention and therefore should be limited only by the scope of the appended claim.

What is claimed is:

A fish lure comprising a hollow body of generally oval cross section having a mouth at one end thereof, outwardly projecting upper and lower lips on said body at the mouth end thereof, and a fishing line attachment plate positioned wholly within said body adjacent said mouth and extending along the longitudinal center line of said body, said plate being secured along its opposite longitudinal edges to said body and having a row of spaced apertures along one free transverse marginal edge thereof adjacent said mouth whereby a fishing line can be selectively secured in one of said apertures.

References Cited in the file of this patent

UNITED STATES PATENTS

| | | |
|---|---|---|
| 1,913,362 | Catarau | June 13, 1933 |
| 2,229,239 | Davis | Jan. 21, 1941 |
| 2,283,960 | Wade | May 26, 1942 |
| 2,317,781 | Lehto | Apr. 27, 1943 |
| 2,559,542 | Mintner | July 3, 1951 |
| 2,569,465 | Farr | Oct. 2, 1951 |